(12) United States Patent
Blecher et al.

(10) Patent No.: US 12,544,018 B2
(45) Date of Patent: Feb. 10, 2026

(54) METHOD FOR DIGITAL VOLUME TOMOGRAPHY IMAGING OF A SMALL VOLUME

(71) Applicants: DENTSPLY SIRONA Inc., York, PA (US); Sirona Dental Systems GmbH, Bensheim (DE)

(72) Inventors: Wolf Blecher, Hemsbach (DE); Michael Elvers, Darmstadt (DE)

(73) Assignees: Dentsply Sirona, Inc., York, PA (US); Sirona Dental Systems GmbH, Bensheim (DE)

(*) Notice: Subject to any disclaimer, the term of this patent is extended or adjusted under 35 U.S.C. 154(b) by 172 days.

(21) Appl. No.: 18/687,366

(22) PCT Filed: Jul. 19, 2022

(86) PCT No.: PCT/EP2022/070174
§ 371 (c)(1),
(2) Date: Feb. 28, 2024

(87) PCT Pub. No.: WO2023/030741
PCT Pub. Date: Mar. 9, 2023

(65) Prior Publication Data
US 2024/0350101 A1 Oct. 24, 2024

(30) Foreign Application Priority Data
Aug. 30, 2021 (EP) .................................. 21193713

(51) Int. Cl.
*A61B 6/00* (2024.01)
*A61B 6/03* (2006.01)
(Continued)

(52) U.S. Cl.
CPC .............. *A61B 6/032* (2013.01); *A61B 6/488* (2013.01); *A61B 6/51* (2024.01); *A61B 6/542* (2013.01); *A61B 6/582* (2013.01)

(58) Field of Classification Search
CPC ......... A61B 6/032; A61B 6/469; A61B 6/488; A61B 6/542; A61B 6/582; A61B 6/51
See application file for complete search history.

(56) References Cited

U.S. PATENT DOCUMENTS

2004/0247069 A1 12/2004 Arai
2020/0261039 A1* 8/2020 Varlet .................. A61B 6/4085

FOREIGN PATENT DOCUMENTS

EP 2613702 A2 7/2013
EP 3461417 A1 4/2019
(Continued)

OTHER PUBLICATIONS

International Search Report; PCT/EP2022/070174; Oct. 14, 2022 (completed); Oct. 26, 2022 (mailed).
(Continued)

*Primary Examiner* — Dani Fox
(74) *Attorney, Agent, or Firm* — SCHWEGMAN LUNDBERG & WOESSNER, P.A.

(57) ABSTRACT

A method in which: (a) a patient is positioned in an X-ray device; (b) a 3D scout image with reduced dose and with a predefined volume sizes and a predefined center of rotation is created; (c) on the 3D scout image, a practitioner marks the tooth (d) a software determines, based on the position of the enveloping geometry, the available centers of rotation and calculates, based on reference points of the enveloping geometry, the imaging positions; (e) based on the imaging positions, a center of rotation is selected; (f) the previously determined aperture positions and the detector regions to be irradiated are transmitted; (g) the high-resolution image is reconstructed and the newly acquired high-resolution infor-
(Continued)

mation is superimposed in the 3D scout image; (h) the practitioner receives the 3D scout image for diagnosis and further use.

12 Claims, 5 Drawing Sheets

(51) Int. Cl.
    *A61B 6/51* (2024.01)
    *A61B 6/58* (2024.01)

(56) References Cited

FOREIGN PATENT DOCUMENTS

| JP | 2009136665 A | 6/2009 |
| WO | 2012032220 A2 | 3/2012 |

OTHER PUBLICATIONS

Written Opinion of the International Searching Authority; PCT/EP2022/070174; Oct. 14, 2022 (completed); Oct. 26, 2022 (mailed).
Kaasalainen et al.; "Dental cone beam CT: An updated review"; Physica Medica; vol. 88; Jul. 17, 2021; pp. 193-217.
Gomes et al.; "An investigation of low-dose 3D scout scans for computed tomography"; Progress in Biomedical Optics and Imaging, Spie—International Society for Optical Engineering; vol. 10132; Mar. 3, 2017; pp. 101322M-101322M.

\* cited by examiner

METHOD FOR DIGITAL VOLUME TOMOGRAPHY IMAGING OF A SMALL VOLUME

CROSS-REFERENCE TO RELATED APPLICATIONS

This is a National Phase application of International Application No. PCT/EP2022/070174, filed Jul. 19, 2022, which claims the benefit of and priority to European Application Ser. No. 21193713.1, filed on Aug. 30, 2021, which are herein incorporated by reference for all purposes.

TECHNICAL FIELD OF THE INVENTION

The present invention relates to a method for digital volume tomography (DVT) imaging in the dental field.

BACKGROUND OF THE INVENTION

The choice of a small volume for a 3D imaging plays a major role, especially in endodontics. The 3D images provide the practitioner with important information on the position and course of the root canals, which can be decisive for the success of the treatment. A small volume (e.g., just enough for a single tooth) minimizes the dose exposure for the patient without denying the practitioner the additional insight gained compared to a 2D image. The difficulty with an image limited to a single tooth lies in the exact positioning of the volume on the one hand, and in the precise execution of the imaging with the small volume on the other. Particularly in the case of DVT devices that do not travel a pure circular path and thus offer, for example, greater shoulder clearance with a smaller device footprint, individual available centers of rotation are calibrated in order to enable good reconstruction of the acquired data by knowing the exact run of the device. Here, it is currently not possible to arbitrarily place a volume of a small size in the maximum possible field-of-view while still providing good reconstruction. In general, a free placement of a small volume can be realized by shifting the center of rotation and driving a circular path around the selected point. The selection of a small center of rotation (e.g. 2×2 cm or 4×4 cm) is realized in currently known X-ray devices by e.g. a panoramic scout shot or a live view video positioning.

SUMMARY OF THE INVENTION

The present invention aims at providing a method to place, record and reconstruct a small volume at any position in the maximum possible Field of View (FoV) of the DVT X-ray device, given a number of available calibrated centers of rotation, each with or without traveling a circular path.

The method according to the invention is used for digital volume tomography (DVT) imaging of a patient in the dental field. It comprises the following steps: (a) The patient is positioned in an X-ray device; (b) A 3D scout image is created with reduced dose and with a predefined volume sizes and a predefined center of rotation; (c) On the 3D scout image, the practitioner marks the tooth for which it is desired to have high-resolution information with an enveloping geometry; (d) Based on the position of the enveloping geometry, a software determines the available centers of rotation at which this enveloping geometry can be imaged and uses reference points of the enveloping geometry to calculate the imaging positions on an X-ray detector for each of the available centers of rotation; (e) using the imaging positions, a center of rotation is selected from the set of available centers of rotation, and for this center of rotation, aperture positions for the imaging and the detector regions to be irradiated for the enveloping geometry are determined during the imaging; (f) the previously determined aperture positions and the detector regions to be irradiated are transmitted to the X-ray device, and now a high-resolution imaging is performed with the center of rotation selected from the set of available ones and the transmitted aperture positions; (g) A high-resolution image is reconstructed and the newly acquired high-resolution information is superimposed in the 3D scout image; (h) The practitioner receives the 3D scout image for diagnosis and further use, in which the previously marked enveloping geometry is superimposed by the high-resolution information.

A significant advantageous effect of the present invention is that the method proposed herein makes it possible for the first time to position, record, and reconstruct a volume of virtually any size at any location within the maximum possible FoV in DVT devices with predefined calibrated centers of rotation.

Another significant advantageous effect of the present invention is that by pre-calculating and commanding the different aperture positions during imaging based on the selected center of rotation, the desired imaging area can be accurately imaged.

In a variant of the method according to the invention, steps (b) and (c) are replaced by the following steps: (b1') The operator marks the tooth for which it is desired to have high-resolution information by means of a tooth chart; (b2) The X-ray device automatically determines the optimal calibrated center of rotation for the 3D scout image that certainly images this marked tooth; (b3') a 3D scout image is created with reduced dose and with a predefined volume sizes and the optimal available calibrated center of rotation from the previous step; (c') by means of software, the marked tooth is found on the 3D scout image and a geometry enveloping the marked tooth is automatically determined.

In a further variant of the method according to the invention, steps (b) and (c) are replaced by the following steps: (b") The practitioner determines a region on a user interface for which he/she would like to have high-resolution information; (c") A software determines an enveloping geometry on the basis of the selected region and the position of closed temporal supports or another aid. In this alternative, the 3D scout image is omitted. Therefore, step (h) is omitted. And step (g) is replaced by the following step: (g) The high-resolution image is reconstructed and presented to the practitioner for diagnosis.

In further preferred variants of the method according to the invention, in step (e) the center of rotation is selected on the basis of the imaging positions that offers the most advantageous imaging position on the X-ray detector. When determining the most advantageous imaging position, influences such as, for example, the imaging distortion due to the anode angle are taken into account. Alternatively, or in addition, one or more of the criteria such as patient-detector distance, minimization of effective dose, minimization of aperture movement, minimization of the number of aperture positions, or minimization of the size of the detector regions to be irradiated are taken into account when determining the most advantageous imaging position.

BRIEF DESCRIPTION OF THE DRAWINGS

In the following description, the present invention will be explained in more detail by means of exemplary embodiments and with reference to the drawings, wherein FIG. 1—shows a DVT system for digital volume tomography (DVT) imaging according to one embodiment.

Figure 1:
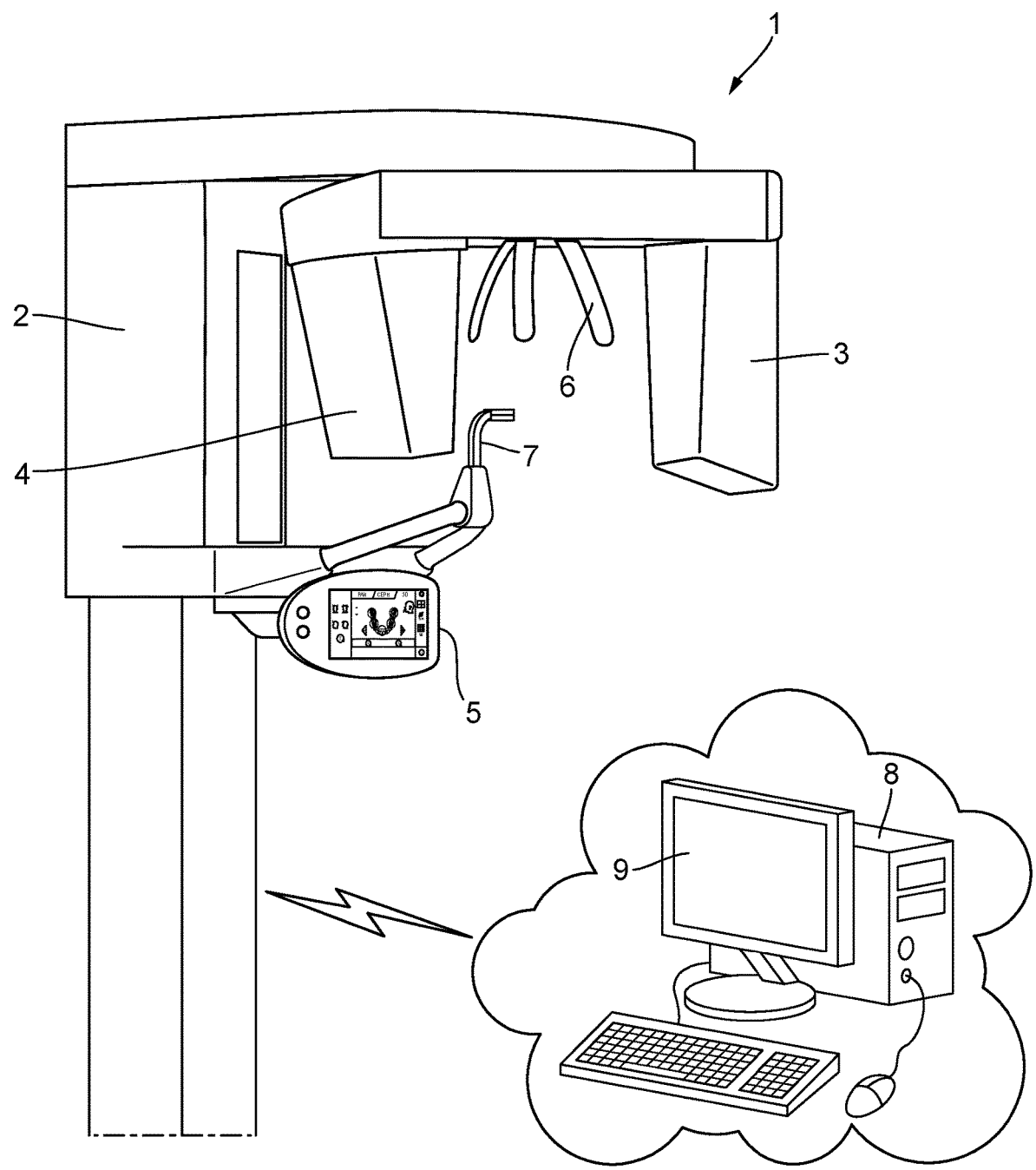

The reference numbers shown in the drawings designate the elements listed below, which are referred to in the following description of exemplary embodiments.

DETAILED DESCRIPTION OF THE INVENTION

1. DVT system
2. X-ray device
3. X-ray source
4. X-ray detector
4a. Detector region (dashed)
5. Control panel/user interface
5a. Tooth chart
5b. Region
6. Head fixation/temple supports
7. Bite
8. Computer
9. Display
9a. 3D Scout image
9b. High resolution image/Information
10. Available volume size
10' Predefined volume size
11. Available centers of rotation
11' Predefined center of rotation
11' Selected center of rotation
12. Tooth
12a. Jaw arch
13. Enveloping geometry
13a-13h Reference points (e.g., Corners)
13' Enveloping geometry (as imaged)
13a'-13h' Imaging positions
14a-14d Aperture positions The alternative methods according to the invention are computer-implemented methods and can each be executed on a computer-assisted DVT system (1). The methods are used for digital volume tomography (DVT) imaging in the dental field. FIG. 1 shows an embodiment of the DVT system (1).

The methods according to the invention are implemented by computer programs having computer-readable code. Each computer program may be provided on a data storage device.

As shown in FIG. 1, the computer-assisted DVT system (1) comprises an X-ray device (2) for performing the patient imaging, with which the individual 2D X-ray images or a sinogram is generated. Prior to the exposure, the patient's head is positioned in the X-ray device (2) with the bite block (7) and the head fixation (6). The X-ray device (2) has an X-ray source (3) and X-ray detector (4) which are rotated around the patient's head during the exposure.

Figure 2A:
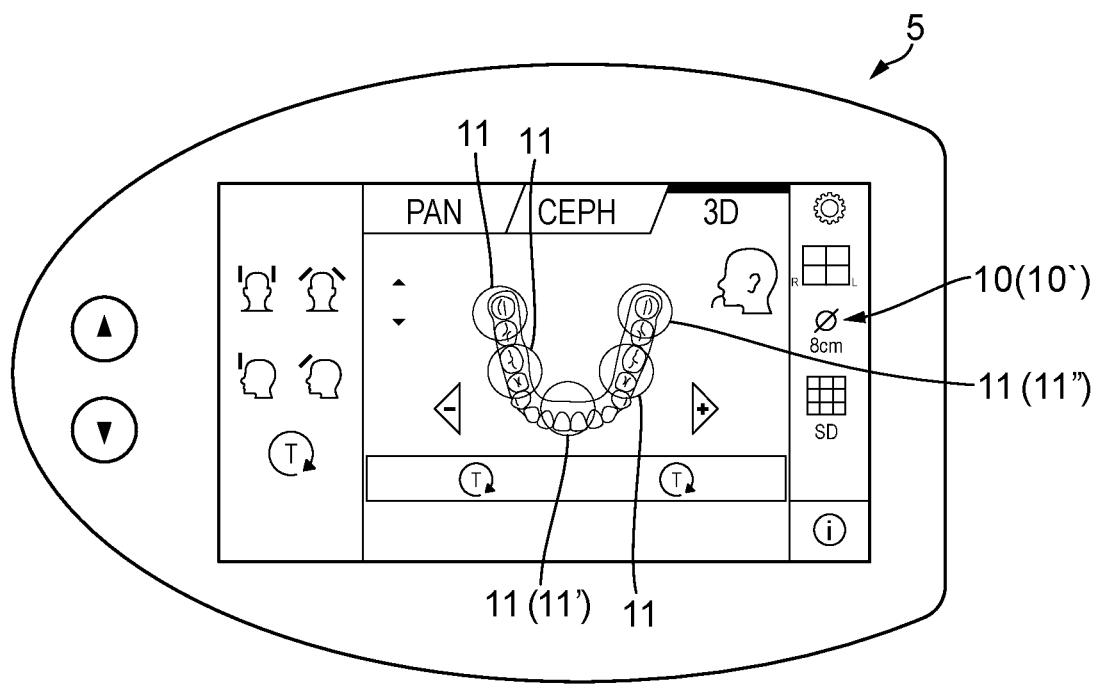
FIG. 2a—shows the control panel of the DVT system from FIG. 1, with the operator performing a 3D scout imaging with a predefined center of rotation and a predefined volume size.
Figure 2B:
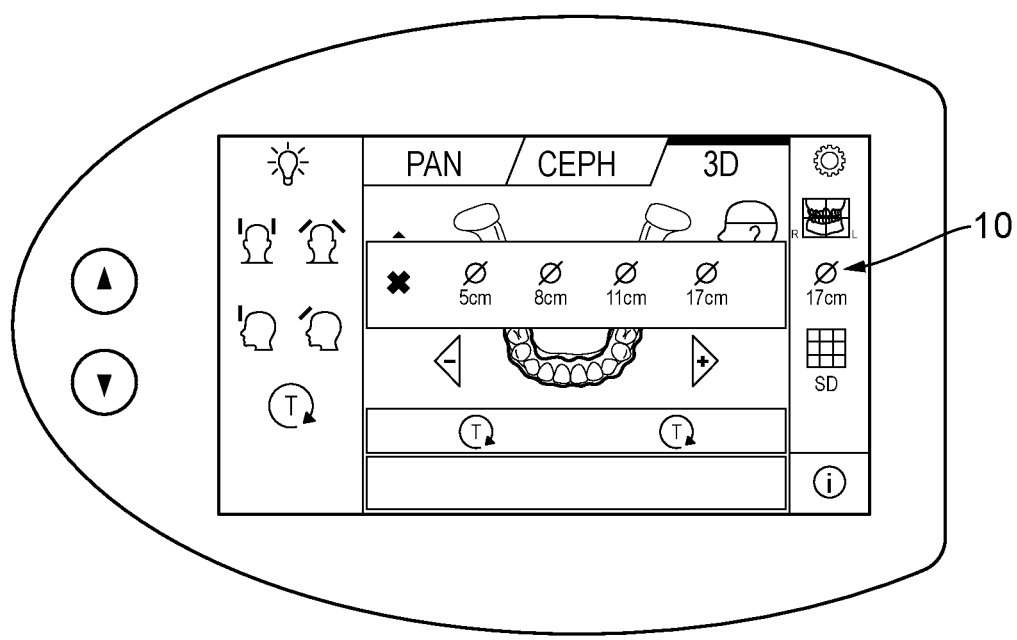
FIG. 2b—shows the control panel of the DVT system from FIG. 1, where the operator can select different predefined volume sizes.

As shown in FIG. 1, the computerized DVT system (1) has a control panel (5). FIG. 2A illustrates an enlarged detail view of a dialog box on the control panel (5) showing available (calibrated) centers of rotation (11). The X-ray device (2) has a rotation mechanism (not shown) whereby the X-ray source (3) and the X-ray detector (4) can be selectively rotated around the patient's head according to one of the available centers of rotation (11). For each available center of rotation (11), the rotation mechanism may follow a corresponding predefined trajectory consisting of a predefined X-ray source trajectory and a predefined X-ray detector trajectory. The trajectories can each describe a circular path. Alternatively, they can preferably assume a more complex curve shape deviating from this, which reduces the space requirement while taking shoulder clearance into account. FIG. 2B shows an enlarged detail view of a dialog box on the control panel (5), where the practitioner can select different available volume sizes (10) with e.g. 5, 8, 11, and 17 cm diameter. An appropriate one of the available volume sizes (10) can be set as a predefined volume size (10') during the methods which will be described later.

As shown in FIG. 1, the computer-assisted DVT system (1) has a separate computer (8) or a computing unit that can be connected to the X-ray device (2) and a separate display (9), among other things to visualize data sets. The computer (8) can be connected to the X-ray device (2) via a local network (not shown) or alternatively via the Internet. The computer (8) may be part of a cloud. Alternatively, the computer (8) may be integrated into the X-ray device (2). The calculations can take place in the computer (8) or in the cloud. The computer (8) executes the computer program and provides the data sets, including for visualization on the display (9). The display (9) can be spatially separated from the X-ray device (2). Preferably, the computer (8) can also control the X-ray device (2). Alternatively, separate computers (8) can be used for control and image processing.

In the following description, the procedures according to alternative embodiments are explained in more detail.

1$^{st}$ Embodiment

Figure 3:
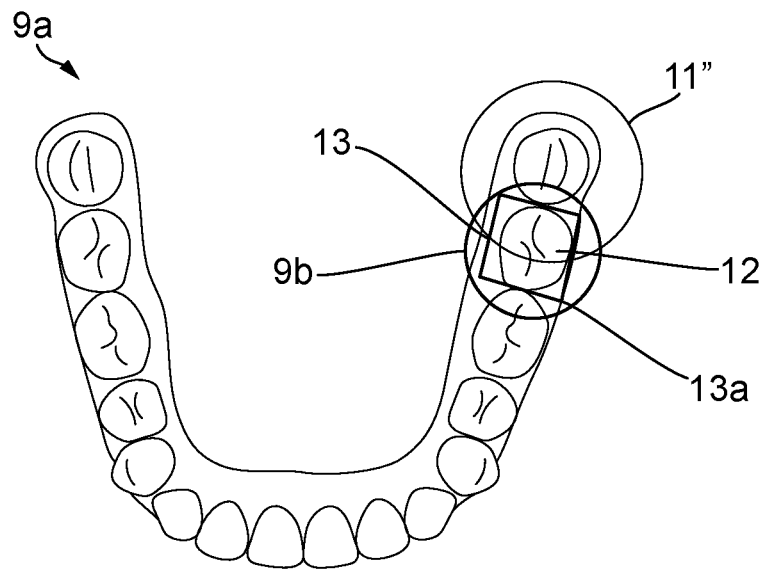
FIG. 3—shows a schematic 3D scout image according to an embodiment in which the practitioner has marked the tooth for which he/she wants high-resolution information with an enveloping geometry.
Figure 4:
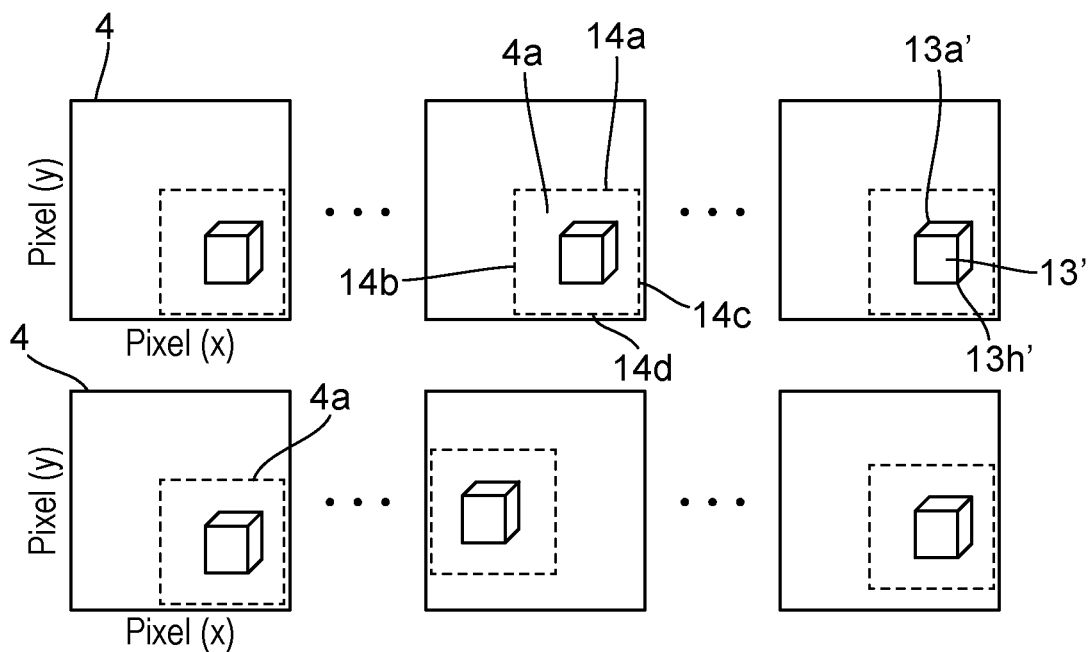
FIG. 4—shows the imaging positions of the enveloping geometry on the X-ray detector for two available centers of rotation respectively in the upper/lower rows where the enveloping geometry can be imaged according to one embodiment.
Figure 5:
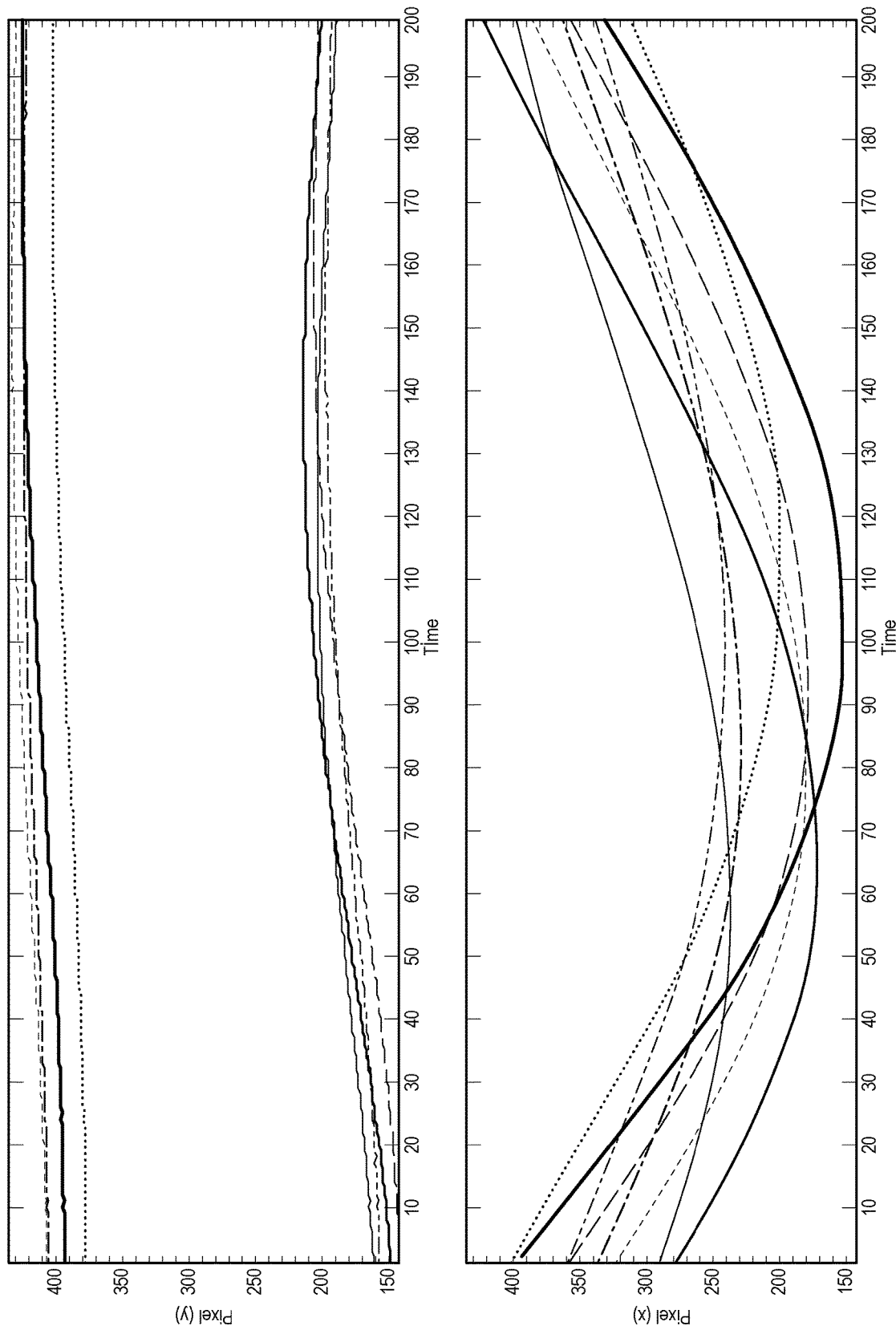
FIG. 5—shows the time course of eight imaging positions of the enveloping geometry in the X-direction and Y-direction of the X-ray detector for the available center of rotation corresponding to the bottom row from FIG. 4.

The method according to the first embodiment comprises steps (a) to (h). In step (a), the patient (not shown) is positioned in the X-ray device (2). In step (b), a 3D scout image (9a) is created with reduced dose and with the predefined volume sizes (10') and a predefined center of rotation (11'). FIG. 3 shows a schematic axial cross-sectional view of the 3D scout image (9a). FIG. 2A shows the predefined volume size (10') and the predefined center of rotation (11'). Where the predefined volume size (10') is, for example, 8 cm in diameter and the predefined center of rotation (11') is, for example, centered on the anterior side of the mandibular arch. In step (c), the operator marks on the 3D scout image (9a) as shown in FIG. 3 the tooth (12) with an enveloping geometry (13) for which he/she wants to have high-resolution information (9b). For example, the enveloping geometry (13) has e.g., cuboid shape or the like with 8 corners that will serve as reference points (13a-13h). In step (d), a software determines the available centers of rotation (11) at which this enveloping geometry (13) can be imaged based on the position of the enveloping geometry (13) and calculates the imaging positions (13a-13h) on the X-ray detector (4) for each of the available centers of rotation (11) based on the reference points (13a-13h) of the enveloping geometry (13) as shown in FIG. 4. In FIG. 4, the top and bottom rows of the X-ray detector (4) each correspond to two available centers of rotation (11) at which the enveloping geometry (13') can be imaged, for example. FIG. 5 shows the time course of eight imaging positions (13a'-13h') of the enveloping geometry (13) along the Y-direction (upper graph) and along the X-direction (lower graph) of the X-ray detector (4) for one of the available centers of rotation corresponding to the lower row from FIG. 4. In step (e), a center of rotation (11") is selected from the set of available centers of rotation (11) based on the imaging positions (13a'-13h'), and for this center of rotation (11"), the aperture positions (14a-d) for the imaging and the detector regions (4a) of the image to be irradiated are determined. In this example, four aperture positions (14a-d) can be determined separately, which frame the imaged enveloping geometry (13') from above, left, below and right (see dashed square). In step (f), the previously determined aperture positions (14a-d) and the detector regions (4a) to be irradiated are transmitted to the X-ray device (2) and now the high-resolution imaging (9b) is performed with the center of rotation (11") selected from the set of available ones and the transmitted aperture positions (14a-d). In step (g), the high-resolution imaging (9b) is reconstructed and the newly acquired high-resolution information (9b) is superimposed on the 3D scout image (9a). In step (h), the practitioner receives the 3D scout image (9a) as schematically shown in FIG. 3, in which the previously marked enveloping geometry (13) is superimposed by the high-resolution information (9b), for diagnosis and further use.

2$^{nd}$ Embodiment

Figure 2C:
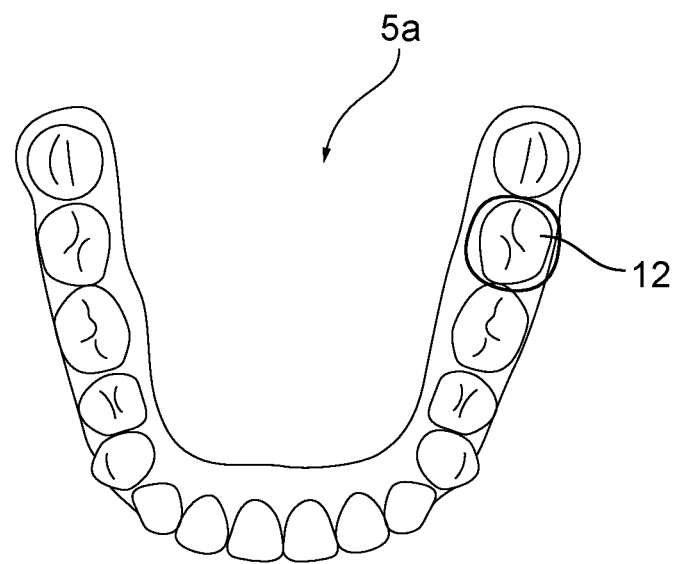
FIG. 2c—shows a tooth diagram in which the dentist marks the tooth for which he/she wants to have high-resolution information.

The method according to the second embodiment comprises the steps (a) to (h) as in the first embodiment, with steps (b) and (c) being replaced by steps (b1'), (b2'), (b3') and (c'). In step (b1'), as shown in FIG. 2c, the practitioner marks the tooth (12) for which he/she wishes to have high-resolution information (9b) using a tooth chart (5a). The tooth chart (5a) can be shown on the display (9) or on the display of the control panel/user interface (5). Marking can be done with the mouse, keyboard or a light pen. The displays can be touch-sensitive. In step (b2'), the X-ray device (2) automatically determines the optimum available calibrated center of rotation (11') for the 3D scout image (9a) that reliably images this marked tooth (12). In step (b3'), a 3D scout image (9a) is created with reduced dose and with the predefined volume sizes (10') and the optimal available calibrated center of rotation (11') from the previous step. In step (c'), a software is used to find the marked tooth (12) on the 3D scout image (9a) and to automatically determine an enveloping geometry (13) enveloping the marked tooth (12).

The rest of the method is as in steps (d) to (h) as in the 1st embodiment. These are not unnecessarily described here again.

3$^{rd}$ Embodiment

Figure 2D:
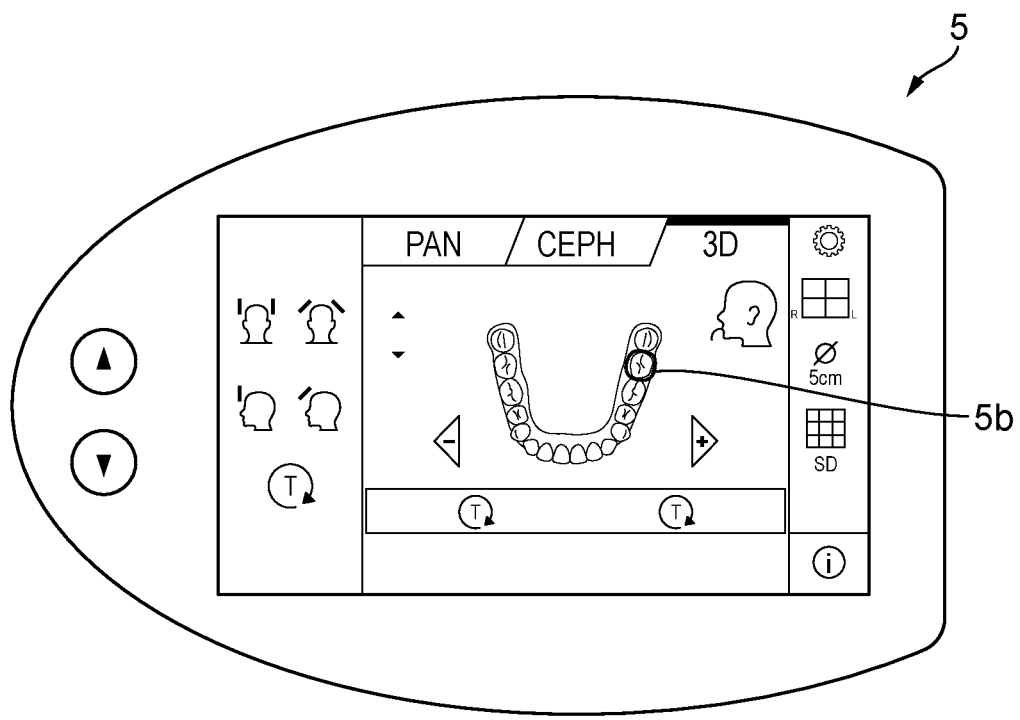
FIG. 2d—shows the control panel of the DVT system from FIG. 1, where the practitioner determines a region on the control panel for which he/she would like to have high-resolution information.

The method according to the third embodiment comprises the steps (a) to (g) as in the first embodiment, wherein the steps (b) and (c) are replaced by the steps (b"), (c") and wherein the step (g) is replaced by the step (g'), and the step (h) is omitted. In step (b"), the operator determines a region (5b), as shown in FIG. 2d, on the user interface (5) for which he/she wants high-resolution information (9b). In step (c"), software determines an enveloping geometry (13) based on the selected region (5b) and the position of the closed temple supports (6) or other aid. The remainder of the procedure is as in steps (d) through (f) of the 1st embodiment. These are not unnecessarily described here again. In step (g'), the high-resolution image (9b) is reconstructed and presented to the operator for evaluation.

According to the present invention, the data sets generated by the methods of the above embodiments may be presented to a physician for visualization, in particular for diagnostic purposes, preferably by means of the display (9) or a printout.

In further preferred variants of the methods described above, in step (e) the center of rotation (11") that offers the most advantageous imaging position (13a'-13h') on the X-ray detector (4) is selected on the basis of the imaging positions (13a'-13h'). When determining the most advantageous imaging position (13a'-13h'), influences such as, the imaging distortion due to the anode angle are taken into account. Alternatively, or additionally, one or more of the criteria such as patient-detector distance, minimization of effective dose, minimization of aperture movement, minimization of the number of aperture positions (14a-d), or minimization of the size of the detector areas (4a) to be irradiated are taken into account when determining the most advantageous imaging position (13a'-13h').

The invention claimed is:

1. A method for digital volume tomography (DVT) imaging in a dental area, comprising:
   (a) positioning a patient in an X-ray device;
   (b) taking a 3D scout image with reduced dose and with a predefined volume sizes and a predefined center of rotation;
   (c) marking, on the 3D scout image, the tooth for which it is desired to have high resolution information with an enveloping geometry;
   (d) computing, by a software, based on a position of the enveloping geometry, available centers of rotation at which the enveloping geometry can be imaged, and calculating, based on reference points of the enveloping geometry, imaging positions on the X-ray detector for each of the available centers of rotation;
   (e) selecting, using the imaging positions, a center of rotation from the available centers of rotation, and computing for the predefined center of rotation aperture positions for the imaging and detector regions to be irradiated for the imaging;
   (f) transmitting the aperture positions and the detector regions to be irradiated to the X-ray device and performing a high-resolution exposure with the said predefined center of rotation selected from the available centers of rotation and with the transmitted aperture positions;

(g) reconstructing the high-resolution image and the newly acquired high-resolution information is superimposed in the 3D scout image;
(h) displaying the 3D scout image for evaluation and further use, in which the previously marked enveloping geometry is superimposed by the high-resolution information.

2. A method for digital volume tomography (DVT) imaging in a dental area, comprising:
(a) positioning a patient is positioned in an X-ray device;
(b1') marking the tooth for which it is desired to have high-resolution information using a tooth chart;
(b2') automatically determining by the X-ray device an optimal calibrated center of rotation for a 3D scout image that images this marked tooth;
(b3') creating the 3D scout image with reduced dose and with a predefined volume sizes and the optimal calibrated center of rotation from (b2');
(c') locating, by a software, the marked tooth on the 3D scout image and automatically determining an enveloping geometry enveloping the marked tooth;
(d) computing, by a software using a position of the enveloping geometry, a set of available centers of rotation at which the enveloping geometry can be imaged, and calculating, using reference points of the enveloping geometry, imaging positions on the X-ray detector for each of the available centers of rotation;
(e) selecting, based on the imaging positions, a center of rotation from the set of available centers of rotation, and aperture positions for imaging and detector regions to be irradiated for the imaging are determined for optimal calibrated center of rotation;
(f) transmitting the previously determined aperture positions and detector regions to be irradiated to the X-ray device and carrying out the high-resolution imaging with the optimal calibrated center of rotation selected from the set of available ones and the transmitted aperture positions;
(g) reconstructing a high-resolution image and superimposing a newly acquired high-resolution information on the 3D scout image;
(h) displaying the 3D scout image, in which the enveloping geometry is superimposed by the high-resolution information.

3. A method for digital volume tomography (DVT) imaging in a dental area, comprising:
(a) positioning a patient in an X-ray device;
(b") determining a region on a user interface for which it is desired to have a high resolution information;
(c") determining by a software an enveloping geometry using the region and a position of closed temple supports or another aid;
(d) computing, based on the position of the enveloping geometry available centers of rotation at which the enveloping geometry can be imaged and calculating, based on reference points of the enveloping geometry, imaging positions on the X-ray detector for each of the available centers of rotation;
(e) selecting, based on the imaging positions, a center of rotation from the available centers of rotation, and aperture positions for imaging and detector regions to be irradiated for the imaging are determined for the center of rotation;
(f) transmitting the aperture positions and the detector regions to be irradiated to the X-ray device and carrying out a high-resolution imaging with the center of rotation selected from the centers of rotation and the transmitted aperture positions;
(g') reconstructing and presenting the high-resolution imaging to the operator for evaluation.

4. A non-transitory computer-readable medium storing instructions which, when executed by a computerized DVT system, causes the computerized DVT system to perform the method of claim 1.

5. A computerized DVT system comprising an X-ray device and a computing unit configured to perform the method of claim 1.

6. The method according to claim 1, wherein in (e) on a basis of the imaging positions the center of rotation is selected to provide optimal imaging positions on the X-ray detector, taking into account influences including an imaging distortion due to an anode angle, or criteria selected from the list consisting of patient-detector distance, minimizing effective dose, minimizing the aperture movement, minimizing a number of aperture positions, minimizing a size of the detector regions to be irradiated.

7. The method according to claim 2, wherein in (e) on a basis of the imaging positions the center of rotation is selected to provide optimal imaging positions on the X-ray detector, taking into account influences including an imaging distortion due to an anode angle, or criteria selected from the list consisting of patient-detector distance, minimizing effective dose, minimizing the aperture movement, minimizing a number of aperture positions, minimizing a size of the detector regions to be irradiated.

8. The method according to claim 3, wherein in (e) on a basis of the imaging positions the center of rotation is selected to provide optimal imaging positions on the X-ray detector, taking into account influences including an imaging distortion due to an anode angle, or criteria selected from the list consisting of patient-detector distance, minimizing effective dose, minimizing the aperture movement, minimizing a number of aperture positions, minimizing a size of the detector regions to be irradiated.

9. A non-transitory computer-readable medium storing instructions which, when executed by a computerized DVT system, causes the computerized DVT system to perform the method of claim 2.

10. A computerized DVT system comprising an X-ray device and a computing unit configured to perform the method of claim 2.

11. A non-transitory computer-readable medium storing instructions which, when executed by a computerized DVT system, causes the computerized DVT system to perform the method of claim 3.

12. A computerized DVT system comprising an X-ray device and a computing unit configured to perform the method of claim 3.

* * * * *